(No Model.)

R. FULLERTON.
MEDICINE DOSE INDICATOR.

No. 545,481. Patented Sept. 3, 1895.

Witnesses:
W. J. Pankey
R. H. Orwig

Inventor: Robert Fullerton,
By Thomas G. and J. Ralph Orwig, Attorneys.

UNITED STATES PATENT OFFICE.

ROBERT FULLERTON, OF DES MOINES, IOWA.

MEDICINE-DOSE INDICATOR.

SPECIFICATION forming part of Letters Patent No. 545,481, dated September 3, 1895.

Application filed January 19, 1895. Serial No. 535,429. (No model.)

*To all whom it may concern:*

Be it known that I, ROBERT FULLERTON, a citizen of the United States of America, residing at Des Moines, in the county of Polk and State of Iowa, have invented a new and useful Cup-Cover and Medicine-Dial, of which the following is a specification.

My object is to provide a safeguard to prevent the mistakes incident to administering improper quantities of medicine or proper quantities at improper times.

My invention consists in the construction, arrangement, and combination of the various essential parts of my complete device, as hereinafter set forth, pointed out in the claim, and illustrated in the accompanying drawings, in which—

Figure 2:
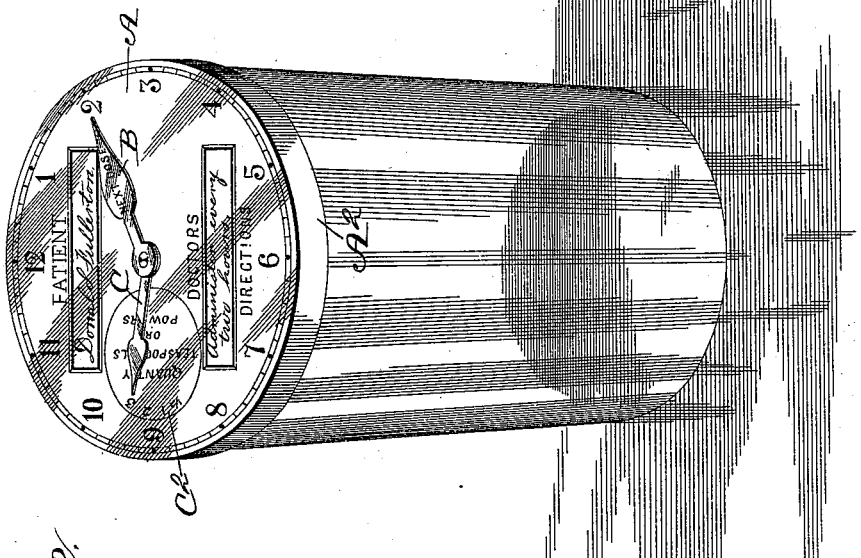
Figure 1:
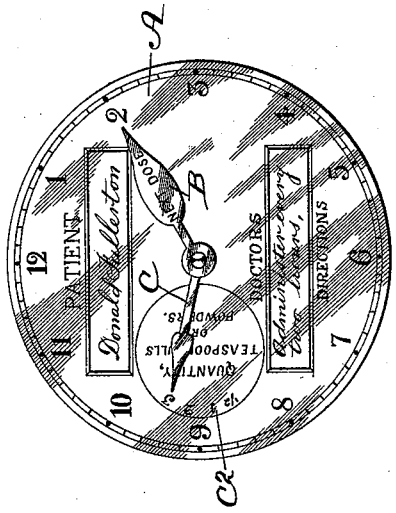

Figure 1 is a top or plan view of the complete device. Fig. 2 is a perspective view of the same applied to a glass.

Referring to the accompanying drawings, the reference-letter A indicates a disk preferably made of celluloid and having a downwardly-projecting flange $A^2$ at its circumference adapted to overlap the sides of a cup or glass.

B indicates a broad hand pivoted in the center of the disk to point out the hours and fractional parts thereof on the clock-dial and having printed thereon the words "Next Dose." The clock-dial is in concentric position with the cover and the pivot of the movable hand.

C is a short pointer jointly pivoted to the center of the disk with the hand B and adapted to point to a distinct scale of numerals $C^2$, located in an eccentric position relative to the clock-dial and the center of motion of the hand. In the small circle that incloses this distinct scale or indicia are printed the words "Teaspoonfuls," "Powders," "Pills," or other words suggestive of the medicine to be taken at intervals. By thus arranging the scale marked "Quantity" near the circumference of the cover and pivoting the pointer C at the center of the cover the pointer can be readily moved from one numeral to another and from one end of the scale to the other by a fractional part of a revolution and properly adjusted, relative to the figures of the scale, with less liability to error than when a pointer and a scale are in concentric positions relative to each other.

At the top of the disk is a blank space, above which is printed the word "Patient," and at the bottom a corresponding space is marked "Doctor's Directions." In these prepared and distinct spaces the proper data are written in pencil and readily erased and the name and directions changed.

In hospitals or where two or more patients are being treated great danger and risk are incurred by having medicines in the same kind of receptacles to be given to different patients and containing different ingredients.

In the practical use of my safeguard device the name of the patient is written or otherwise placed in the space prepared therefor under the word "Patient" and in the prepared space between the words "Doctor's Directions" the intervals of time at which the medicine is to be given to the patient. The quantity to be given in tea-spoonfuls or numbers of powders or pills is then registered by moving the pointer C to the proper numeral in the scale $C^2$, as required to indicate the quantity. The time for administering the first dose is then registered by moving the hand B relative to the clock-dial and the proper hour-mark or fractional part of an hour between two hour-marks. When thus arranged, it is obvious that any person of ordinary intelligence can see what quantity and at what time successive doses should be given at the time prescribed by a physician and registered by the two distinct indicia so conspicuous upon the cover fitted to and placed over a receptacle adapted to contain and protect the medicine.

It is obvious that without prepared places for the name of the patient and the directions of the physician the device would be incomplete and liable to cause mistakes where the same person has charge of two or more patients and is required to administer different kinds and different quantities of medicine at different intervals of time to different patients. The prepared places for a name and directions are therefore essential in the successful use of the invention as a means of preventing serious or fatal mistakes in giving medicine to a patient.

I claim as my invention—

A cup cover having a hand and a pointer jointly pivoted to the center of the cover, a clock dial at the circumference of the cover and concentric with the pivot of the movable hand that extends to the dial, a scale of numerals located in an eccentric position relative to the said hand and dial and the pivoted pointer that extends to said scale marked "Quantity," the pivoted hand marked "Next Dose," a prepared place on the cover for a person's name and a prepared place on the cover for a doctor's directions, arranged in the manner set forth for the purposes stated.

ROBERT FULLERTON.

Witnesses:
J. RALPH ORWIG,
THOMAS G. ORWIG.